US012286567B2

(12) United States Patent
Register et al.

(10) Patent No.: US 12,286,567 B2
(45) Date of Patent: Apr. 29, 2025

(54) SYSTEM FOR CURING A PATCH

(71) Applicant: The Boeing Company, Chicago, IL (US)

(72) Inventors: Justin H. Register, Charleston, SC (US); Remmelt Andrew Staal, Irvine, CA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/489,724

(22) Filed: Oct. 18, 2023

(65) Prior Publication Data

US 2024/0067847 A1 Feb. 29, 2024

Related U.S. Application Data

(62) Division of application No. 17/529,079, filed on Nov. 17, 2021, now Pat. No. 11,827,821.

(60) Provisional application No. 63/145,839, filed on Feb. 4, 2021.

(51) Int. Cl.
B64F 5/40 (2017.01)
C09J 5/02 (2006.01)

(52) U.S. Cl.
CPC .. *C09J 5/02* (2013.01); *B64F 5/40* (2017.01)

(58) Field of Classification Search
CPC ........................................................ B63F 5/40
See application file for complete search history.

(56) References Cited

U.S. PATENT DOCUMENTS

| 10,350,839 | B2 | 7/2019 | Safai | |
|---|---|---|---|---|
| 2003/0188821 | A1* | 10/2003 | Keller | B29C 43/12 156/286 |
| 2005/0008862 | A1* | 1/2005 | Joseph | B29C 70/542 44/620 |
| 2011/0139344 | A1 | 6/2011 | Watson | |
| 2014/0196833 | A1 | 7/2014 | Byron | |
| 2014/0295124 | A1 | 10/2014 | Suhara et al. | |
| 2017/0008184 | A1* | 1/2017 | Tomblin | B26D 5/007 |
| 2019/0275755 | A1* | 9/2019 | Ihn | B29C 70/545 |
| 2021/0060879 | A1* | 3/2021 | Varghese | B33Y 80/00 |
| 2022/0118617 | A1* | 4/2022 | McCay | B25J 9/1664 |

FOREIGN PATENT DOCUMENTS

| EP | 1782942 | A1 * | 5/2007 |
| EP | 2527415 | A1 | 11/2012 |
| EP | 3095595 | A1 | 11/2016 |
| WO | 2017081456 | A | 5/2017 |
| WO | WO-2017/081456 | * | 5/2017 |

OTHER PUBLICATIONS

Whittingham, B., et al. "Micrographic Studies on Adhesively Bonded Scarf Repairs to Thick Composite Aircraft Structure." Composites Par A: Applied Science and Manufacturing, Aug. 31, 2008, 14 pages.

* cited by examiner

*Primary Examiner* — Jeffry H Aftergut

(74) *Attorney, Agent, or Firm* — Alleman Hall & Tuttle LLP

(57) ABSTRACT

A method for curing a patch. The method includes generating the patch according to a negative of a scan of a scarf in a composite material. The method also includes pre-curing the patch.

20 Claims, 5 Drawing Sheets

SYSTEM FOR CURING A PATCH

RELATED APPLICATIONS

This application claims priority to U.S. application Ser. No. 17/529,079, filed Nov. 17, 2021, which claims priority to U.S. Provisional Patent Application 63/145,839, filed Feb. 4, 2021, the entireties of which are hereby incorporated by reference.

BACKGROUND

Objects sometimes develop inconsistencies. The term "inconsistency" is defined as a physically measurable feature on or in the object, where the presence of the feature causes the object to be outside of at least one pre-defined engineering tolerance.

In many cases, a task is undertaken to rework an inconsistency. The term "rework" is defined as a procedure to physically alter the object so as to bring the object back within the pre-defined engineering tolerance. Thus, reworking removes or otherwise mitigates the inconsistency.

In the case of an object formed from a composite material, an object may develop one or more inconsistencies over the lifetime of the object. One method for reworking an inconsistency in or on the object is to patch the composite material in the location of the inconsistency.

SUMMARY

The one or more embodiments provide for a method for curing a patch. The method includes generating the patch according to a negative of a scan of a scarf in a composite material. The method also includes pre-curing the patch.

The one or more embodiments also provide for another method. The method includes generating, at a rework facility, a scan of a scarf in a composite material. The method also includes receiving, at the rework facility from a patch generation facility remote from the rework facility, a pre-cured patch generated according to a negative of the scan.

The one or more embodiments also provide for a system. The system includes a computer configured to receive, from a rework facility, shape data from a scan of a scarf in an object including a composite material located at the rework facility. The system also includes a lathe tool located at a patch generation facility remote from the rework facility, the late tool in communication with the computer. The lathe tool and the computer are configured to create a mandrel based on the shape data, the mandrel including a mandrel shape that is a negative of the shape data.

Other aspects of the one or more embodiments will be apparent from the following description and the appended claims.

DETAILED DESCRIPTION

Figure 1:
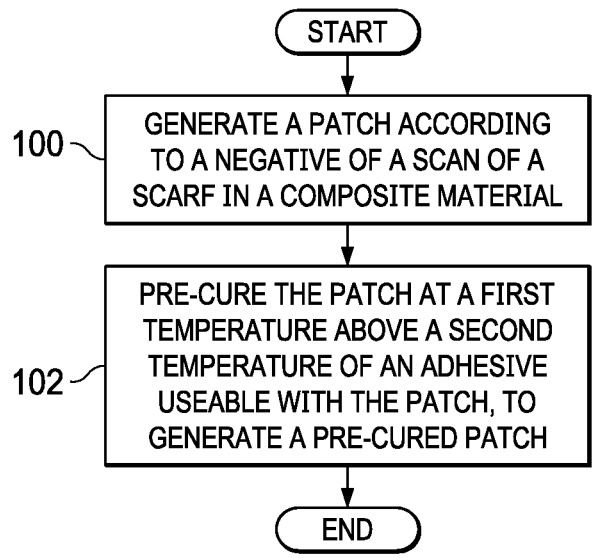
FIG. 1 is a flowchart of a method for curing a patch, in accordance with one or more embodiments.

Specific embodiments of the one or more embodiments will now be described in detail with reference to the accompanying figures. Like elements in the various figures are denoted by like reference numerals for consistency.

In the following detailed description of the embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about."

As used herein, the term "connected to" contemplates at least two meanings. In a first meaning, unless otherwise stated, "connected to" means that component A was, at least at some point, separate from component B, but then was later joined to component B in either a fixed or a removably attached arrangement. In a second meaning, unless otherwise stated, "connected to" means that component A could have been integrally formed with component B. Thus, for example, assume a bottom of a pan is "connected to" a wall of the pan. The term "connected to" may be interpreted as the bottom and the wall being separate components that are snapped together, welded, or are otherwise fixedly or removably attached to each other. Additionally, the term "connected to" also may be interpreted as the bottom and the wall being contiguously together as a monocoque body formed by, for example, a molding process. In other words, the bottom and the wall, in being "connected to" each other, could be separate components that are brought together and joined, or may be a single piece of material that is bent at an angle so that the bottom panel and the wall panel are identifiable parts of the single piece of material.

In general, the one or more embodiments relate to methods for reworking inconsistencies in composite materials. In particular, the one or more embodiments are related to a method for precuring a patch.

Reworking an inconsistency in a composite material object sometimes may take the form of scarfing the area of the composite material in which the inconsistency is located. As used herein, a "scarf" is defined as an area of the composite material that has been deliberately sanded, cut out, or otherwise removed in order to remove the inconsistency from the composite object. The scarf is then filled-in using a patch. Further details of the patching process are provided below.

In many cases, when a composite material object has an inconsistency, the composite material object is located remotely from the facility that has the capability to create a patch used as part of the rework process. For example, an aircraft having a composite material inconsistency to be reworked is located in India, but the facility where a custom patch that precisely fits the particular scarf could be created is in the United States. Under these circumstances, while scarfing the inconsistency can be performed on-site in India, the process of creating a custom patch (that is sized and dimensioned for the particular scarf) may be difficult, impractical, or even impossible. In some cases, pre-sized patches are used to rework the aircraft in India, but using pre-sized patches can be inefficient, time consuming, and wasteful of time and materials. For example a pre-sized patch that is very large in two or even three dimensions might have to be used to fill a scarf that is large in only one dimension. In this case, most of the pre-sized patch is cut away and wasted during the rework process. In rare cases, pre-sized patches are not sufficiently large to rework the inconsistency.

The one or more embodiments address these and other technical issues. In particular, the one or more embodiments provide for scanning the scarf at the remote facility to generate shape data, and then building a custom patch at a remote facility based on the shape data. The custom patch is then pre-cured at the remote facility. The custom pre-cured patch is shipped to the remote site, where the rework process is then performed using the custom pre-cured patch.

Metrology points are added during the scarfing process. A metrology point is a reference point that will be later used for orienting a pre-cured patch on the scarf Metrology data is taken during scanning of the scarf. Using the metrology data, the custom pre-cured patch may have counter metrology points added to the patch in order to aid in orienting the custom pre-cured patch to the specific scarf in question during the re-work process.

The details of the one or more embodiments are described further below. Thus, attention is now turned to the figures.

Figure 2:
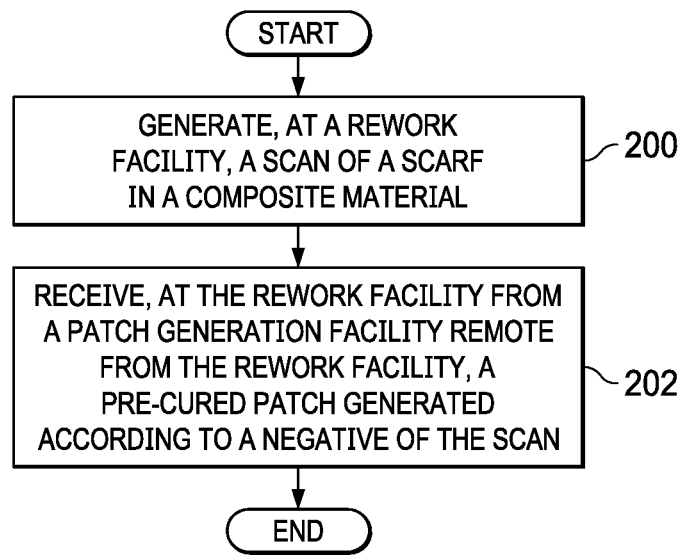
FIG. 2 is a flowchart of a method at a rework facility, in accordance with one or more embodiments.
Figure 3:
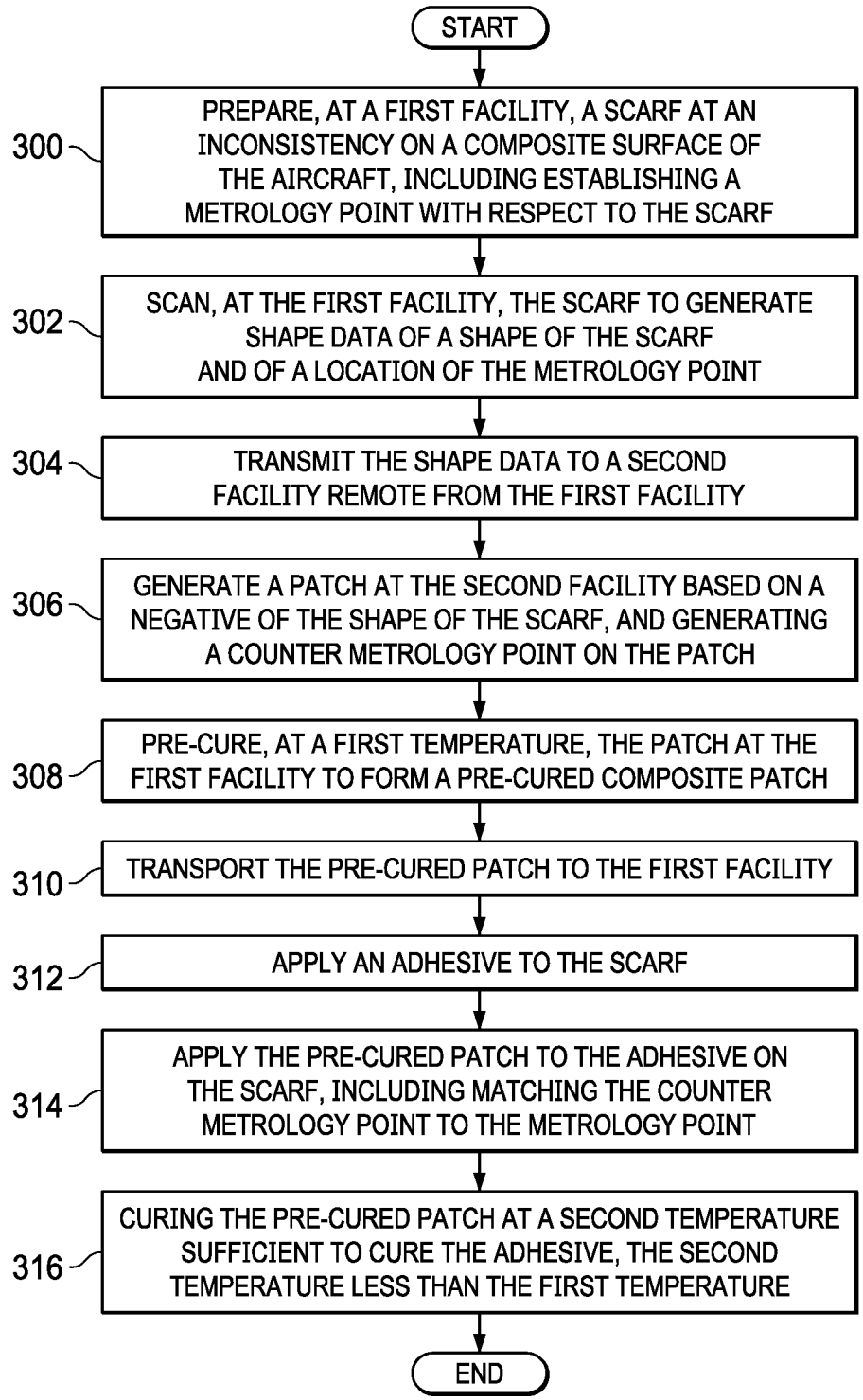
FIG. 3 is a flowchart of a method for reworking an aircraft, in accordance with one or more embodiments.

In particular, FIG. 1 through FIG. 3 are flowcharts, in accordance with one or more embodiments. Attention is first turned to FIG. 1, which is a flowchart of a method for curing a patch, in accordance with one or more embodiments. The method of FIG. 1 may be performed at a patch generation facility, such as patch generation facility (614) of FIG. 6.

Step 100 includes generating a patch according to a negative of a scan of a scarf in a composite material. As explained more fully with respect to FIG. 6 the rework facility receives shape data that described the result of scanning a scarf in a composite material. The shape data is used to generate a mandrel using a negative of the scan image. A patch in the form of at least one composite ply is then laid up on the mandrel. After curing, the at least one composite ply is referred-to as the pre-cured patch.

Figure 6:
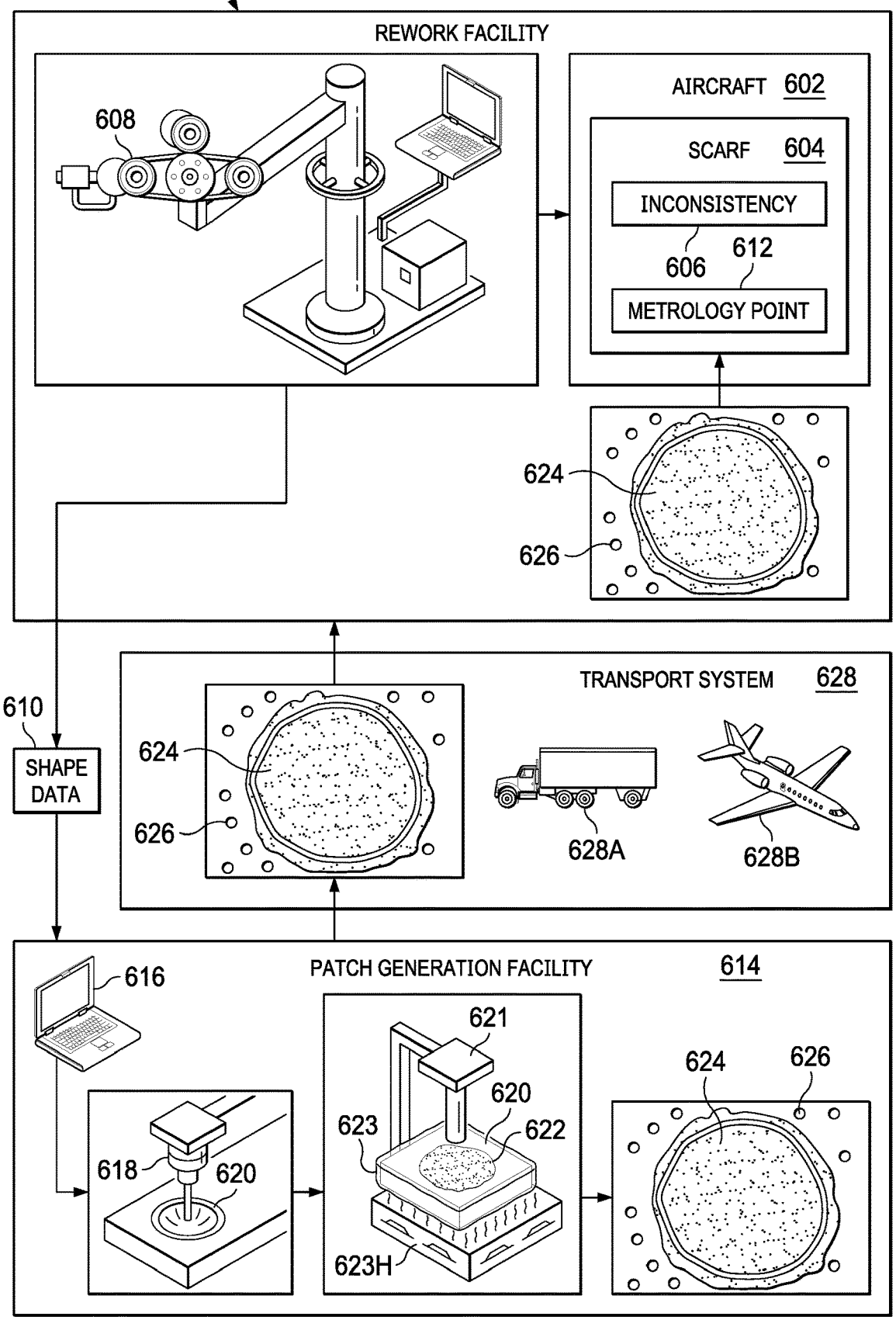

The shape data is generated by scanning the scarf and/or inconsistency at another facility (such as the rework facility in FIG. 6). Shape data is defined as data raw data, taken by a scanning device, that describes the three-dimensional properties of the scarf and/or inconsistency, such as topology, distance measurements, composition measurements, etc. Thus, the shape data is data that describes the inconsistency and/or scarf, and/or may be a picture of the inconsistency and/or scarf.

The material that forms the mandrel may be a carbon foam material, or other suitable material for forming the mandrel, such as titanium. However, a carbon foam material is often useful as carbon foam is less expensive than many other mandrel materials and is also recyclable after use. In the case of a carbon foam material, the surface of the carbon foam material may be sealed in order to protect the mandrel during the patch curing process.

Machining the material may include cutting or sanding away portions of a block of material until the shape of the mandrel conforms to a negative of the shape of the scan of the scarf. For example, a lathing tool may be used to remove material until the negative of the shape is achieved. Alternatively, machining the material may include using a device such as a mold to cast the mandrel and/or a three-dimensional printer to build up layers of mandrel material until the mandrel is formed.

The mandrel is sealed in some cases. Sealing the mandrel includes treating the mandrel surface with an epoxy resin, or some other material, in order to close pores in the mandrel surface or otherwise coat the surface of the mandrel. The coating may also take the form of a release material that allows, after curing, the pre-cured patch to be more easily released from the mandrel.

Thereafter, step 102 includes pre-curing the patch at a first temperature above a second temperature of an adhesive useable with the patch, to generate a pre-cured patch. Once the patch is laid up on the mandrel, the patch is pre-cured at a relatively high temperature.

Pre-curing the patch may involve vacuum bagging the composite patch. During vacuum bagging, the patch is placed inside a vacuum bag, air is removed from the vacuum bag to achieve a pre-determined degree of vacuum, and then heating is applied to the vacuum bag and the patch together. The heat cause chemical reactions that cure the patch, and the vacuum bag applies pressure to the patch so that the patch conforms closely to the shape of the mandrel during the curing process.

The term "relatively high" is a temperature that is above a cure temperature at which a patch adhesive is cured when the patch is ultimately applied to the scarf. In many cases, the cure temperature of the composite material is considered "high". An example of a "high" temperature is a temperature above about 300 degrees Fahrenheit. Some composite materials are pre-cured at about 350 degrees Fahrenheit.

The method of FIG. 1 may be varied. For example, when the patch is generated and pre-cured at a patch generation facility, the scan data is received from a rework facility remote from the patch generation facility. The scan data may be received via file transfer protocol, email, delivery of a non-transitory computer readable storage medium, etc.

In another variation, a counter metrology point is applied to the pre-cured patch. A counter metrology point is a physical marking that is placed on a location on the patch so that the counter metrology point will line up with a metrology point that is disposed on the composite object. Multiple counter metrology points may be present in order to line up with multiple metrology points on or near the scarf. In this manner, the precise orientation of the pre-cured patch with respect to the scarf may be matched once the pre-cured patch is delivered to a rework facility.

In another variation, as indicated above, the method includes machining, prior to pre-curing the patch, a carbon foam material to form a mandrel having a shape conforming to the negative of the scan. Machining may be performed using a lathe. The method may also include sealing, after machining, a surface of the carbon foam material.

Attention is now turned to FIG. 2. FIG. 2 is a flowchart of a method at a rework facility, in accordance with one or more embodiments. The method of FIG. 2 takes place at a rework facility, such as rework facility (600) shown in FIG. 6.

Step 200 includes generating, at a rework facility, a scan of a scarf in a composite material. The scan may be performed using a scanning tool, as described further with respect to FIG. 6. The scan generates the received shape data described above with respect to FIG. 1.

Note that pre-processing may occur prior to generating the scan. Thus, for example, the method may include preparing, prior to generating the scan, the composite material in an area of an inconsistency to form the scarf. Preparing may include removing composite material in the area of the inconsistency, sanding the composite material, etc. The result of preparing generates the scarf.

Step 202 includes receiving, at the rework facility from a patch generation facility remote from the rework facility, a pre-cured patch generated according to a negative of the scan. Receiving may be performed by delivery via a transport system, such as a truck, an aircraft, a courier, etc.

Once the pre-cured patch is received, the pre-cured patch may be used as part of reworking the composite material. Thus, for example, the method may also include applying, after receiving the pre-cured patch, an adhesive to the scarf. The pre-cured patch is applied to the scarf over the adhesive. The pre-cured patch and the adhesive are cured at a second temperature less than a first temperature at which the pre-cured patch was pre-cured.

Other variations are possible. For example, the one or more embodiments may also include applying, before applying the pre-cured patch to the scarf, a scrim between the adhesive and the pre-cured patch. A scrim is a fabric, thin relative to a thickness of the pre-cured patch, weaved to contain spaces between threads of the scrim. The scrim allows gasses to escape that form during cure of the adhesive.

In another variation, generating the scan includes scanning, prior to generating, the scarf to generate surface data. In this case, the scan is generated using the surface data.

Preparing may further include generating a metrology point for the scarf. The metrology point is then added to the scan data. In this case, receiving the pre-cured patch includes receiving the pre-cured patch with the counter metrology point placed to match the metrology point.

In this case, the method may also include applying, after receiving the pre-cured patch, an adhesive to the scarf. The method may also include aligning the counter metrology point on the pre-cured patch with the metrology point of the scarf. The method may also include applying, after aligning, the pre-cured patch to the scarf to the adhesive. The method may also include curing the pre-cured patch and the adhesive together at a second temperature lower than a first temperature at which the pre-cured patch was pre-cured.

Still other variations are possible. Thus, the one or more embodiments are not necessarily limited to the example of FIG. 2.

Attention is now turned to FIG. 3. FIG. 3 is a flowchart of a method for reworking an aircraft, in accordance with one or more embodiments. The method of FIG. 3 is a combination of the methods described with respect to FIG. 1 and FIG. 2. The method of FIG. 3 is performed using a first facility (a rework facility) and a second facility (a patch generation facility).

Step 300 includes preparing, at a first facility, a scarf at an inconsistency on a composite surface of the aircraft, including establishing a metrology point with respect to the scarf. The elements of step 300 may be performed as described with respect to FIG. 1.

Step 302 includes scanning, at the first facility, the scarf to generate shape data of a shape of the scarf and of a location of the metrology point. The elements of step 302 may be performed as described with respect to FIG. 1.

Step 304 includes transmitting the shape data to a second facility remote from the first facility. The elements of step 304 may be performed as described with respect to FIG. 2.

Step 306 includes generating a patch at the second facility. The patch is generated based on a negative of the shape of the scarf. Generating the patch further includes generating a counter metrology point on the patch. The elements of step 306 may be performed as described with respect to FIG. 1.

Step 308 includes pre-curing, at a first temperature, the patch at the first facility to form a pre-cured patch. Again, the first temperature is higher than a cure temperature of the adhesive used below. The elements of step 308 may be performed as described with respect to FIG. 1.

Step 310 includes transporting the pre-cured patch to the first facility. The elements of step 310 may be performed as described with respect to FIG. 1.

Step 312 includes applying an adhesive to the scarf. Step 312 may be performed as described with respect to FIG. 1.

Step 314 includes applying the pre-cured patch to the adhesive on the scarf. Applying further includes matching the counter metrology point to the metrology point. The elements of step 314 may be performed as described with respect to FIG. 1.

Step 316 includes curing the pre-cured patch at a second temperature sufficient to cure the adhesive. The second temperature is less than the first temperature used to cure the pre-cured patch. The elements of step 316 may be performed as described with respect to FIG. 1.

Other variations are possible. Thus, the one or more embodiments are not necessarily limited to the example of FIG. 3.

While the various steps in the flowcharts of FIG. 1 through FIG. 3 are presented and described sequentially, one of ordinary skill will appreciate that some or all of the steps may be executed in different orders, may be combined or omitted, and some or all of the steps may be executed in parallel. Thus, the one or more embodiments are not necessarily limited by the examples provided herein.

Figure 4:
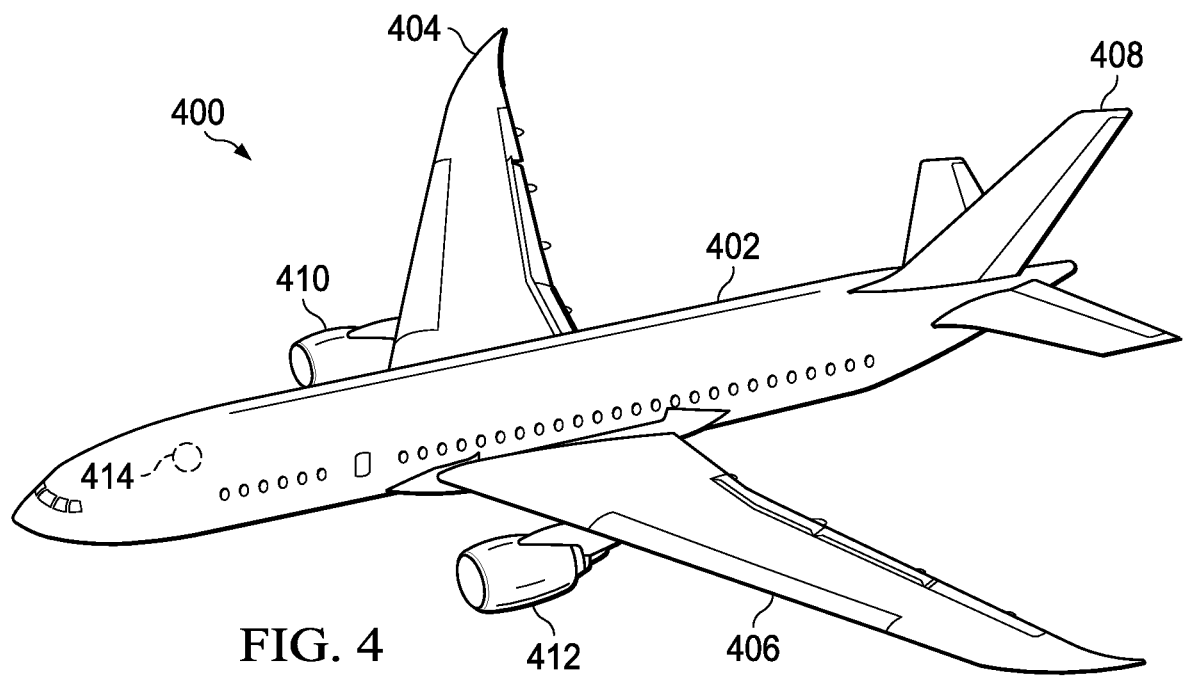
FIG. 4, FIG. 5, and FIG. 6 show an example of reworking an inconsistency on an aircraft, in accordance with one or more embodiments.
Figure 5:
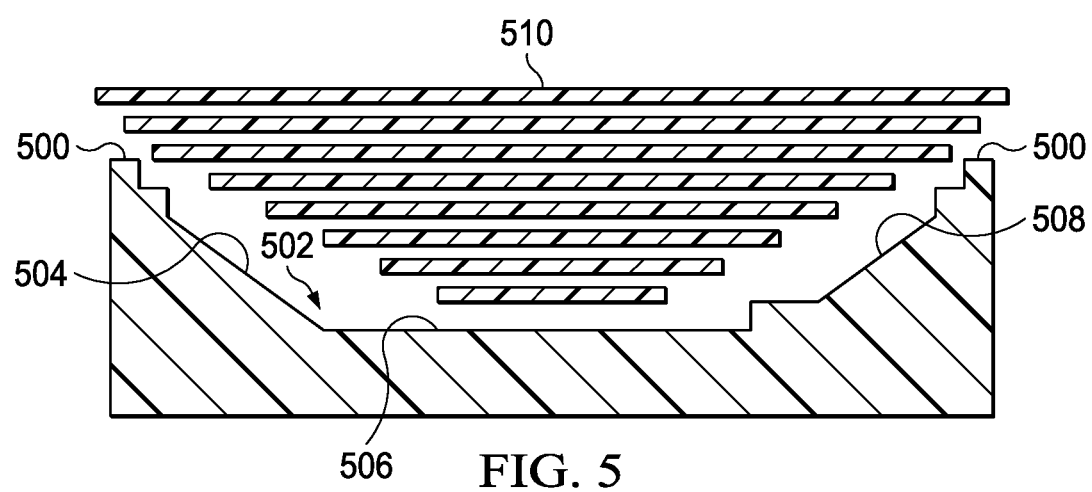

FIG. 4, FIG. 5, and FIG. 6 show an example of reworking an inconsistency on an aircraft, in accordance with one or more embodiments. The following example is for explanatory purposes only and not intended to limit the scope of the one or more embodiments. The example of FIG. 4 through FIG. 6 should be read as a whole. Because FIG. 4 through FIG. 6 relate to a single unified example, FIG. 4 through FIG. 6 share some common reference numerals that relate to similar objects having similar descriptions.

FIG. 4 shows an aircraft. The aircraft (400) of FIG. 4 is an example of the aircraft that could be re-worked according to the procedure described with respect to FIG. 1 through FIG. 3, in accordance with one or more examples. The aircraft (400) includes a fuselage (402), a first wing (404), a second wing (406), and a tail (408). The aircraft (400) in one or more examples includes a propulsion system, such as first engine (410) and second engine (412). The aircraft (400) in one or more examples includes additional components, in addition to those described above.

The aircraft (400) includes an inconsistency (414). The inconsistency, in this specific example, is an area in a panel in the fuselage (402) has experienced partial delamination to a degree that the panel is now outside of pre-determined engineering tolerances.

Attention is now turned to FIG. 5. FIG. 5 shows a close-up view of the inconsistency (414) in a surface (500) of the fuselage (402). A scarf (502), shown at along surface portion (504), surface portion (506), and surface portion (508) has been cut, ground, sanded, or otherwise formed around the inconsistency (414). Stated in an oversimplified manner, the scarf (502) cuts out the inconsistency, leaving a divot in the fuselage (402). As can be seen, the scarf (502) has a particular shape which is unique to the particular rework project at hand.

For reference, a patch (510) is shown. The patch (510) is created according to the procedure described with respect to FIG. 6. The patch (510) has a shape that conforms to the shape of the scarf (502). In other words, the patch (510) is sized and dimensioned to match the size and dimensions of the scarf (502).

Attention is now turned to FIG. 6. FIG. 6 lays out pictorially the process of generating and curing a composite patch described with respect to FIG. 1, in the context of the examples of FIG. 4 and FIG. 5.

A rework facility (600) is servicing an aircraft (602). A technician has formed a scarf (604) in the area of an inconsistency (606). A scanning tool (608) has scanned the scarf (604) and collected shape data (610) that describes the shape, size, and dimensions of the scarf (604). The shape data (610) also includes at least one metrology point (612) established on or near the scarf (604) for later alignment of the pre-cured patch to be manufactured.

The rework facility (600) transmits the shape data (610) to a patch generation facility (614). A computer (616) receives and processes the shape data (610). In particular, the computer (616) is used to control a lathe tool (618). The lathe tool (618) cuts a block of material (e.g. carbon foam) into a negative of the shape of the scarf (604). The resulting shaped block of material is then referred-to as a mandrel (620).

Next, a composite layup (622) is deposited on the mandrel (620) by a layup tool (621). The layup tool (621) is, in this example, a robotic arm that is used to place one or more composite plies, pre-preg, and/or resin (i.e., the "layup") onto the mandrel (620). In other embodiments, the layup tool (621) may be replaced by human technicians who place the composite layup (622) on the mandrel (620), or by other types of machines capable of placing the composite layup (622) on the mandrel (620). The layup tool (621) may include rollers, cutters, resin injectors, robotic hands, and other such tools.

The composite layup (622) itself is one or more plies of pre-preg placed over the mandrel (620). Note, however, in other embodiments, dry composite fiber material may be placed over the composite layup (622) and resin added to the dry composite fiber material. In either case, the composite layup (622) is trimmed to a size that about matches the size of the mandrel (620), though some excess may be allowed in order to place one or more counter metrology points on the patch.

The composite layup (622) may be placed in a vacuum bag (623). Air is evacuated from the vacuum bag (623). As a result, atmospheric air pressure outside the bag presses down the composite layup (622) onto the mandrel (620). A heater (623H) then applies heat to the combination of the vacuum bag (623) and the composite layup (622). The heat is applied at a cure temperature of the composite part, which is usually higher than the cure temperature of an adhesive, as indicated above. In an example, the cure temperature is 350 degrees Fahrenheit and a cure time is several hours. In this manner, heating the patch is accomplished.

At the end of the curing process, the composite layup (622) is transformed into a pre-cured patch (624). At least one counter metrology point (626) is marked on or near the pre-cured patch (624). Excess composite material may be removed from the pre-cured patch (624) by sanding, cutting, or lathing.

The pre-cured patch (624) is then transported to the rework facility (600), by a transport system (628). The transport system (628) may be by any convenient transportation device, such as an aircraft (628A) or a truck (628B). However, the transport system (628) may take different forms, such as a water vessel, a drone, a courier, etc.

Once the pre-cured patch (624) is at the rework facility (600), the pre-cured patch (624) is applied to the scarf (604). In particular, an adhesive is applied to the scarf (604). A scrim may be placed between the pre-cured patch (624) and the scarf (604) to allow for gasses to escape during the adhesive curing process. The counter metrology point (626) is lined up with the metrology point (612), together with possibly other metrology points and counter metrology points, thereby ensuring a correct alignment of the pre-cured patch (624) over the scarf (604). Once the pre-cured patch (624) is in place within and/or over the scarf (604), the pre-cured patch (624) and scarf (604) are again heated, in order to cure the adhesive. The curing temperature of the adhesive is less than the curing temperature of the pre-cured patch (624). The curing temperature of the adhesive is about 250 degrees Fahrenheit in one embodiment. However, in other embodiments, the curing temperature of the adhesive may be higher, and may be as high or higher as the curing temperature of the patch in some embodiments. The pre-cured patch (624) and the scarf (604) may be vacuum bagged over the site of the scarf (604) while the adhesive is curing.

Once the adhesive has cured, the pre-cured patch (624) and the area near the scarf (604) are finished. Finishing involves sanding, cutting, or other material removal techniques to ensure that the pre-cured patch (624) and the scarf (604) are smoothly integrated with the remaining composite material of the aircraft (602). The area of the pre-cured patch (624) and the scarf (604) may be polished and then painted so that the aircraft (602) has an appealing cosmetic appearance, in addition to being, once again, within desired engineering tolerances. The aircraft (602) is then returned to operational service.

Figure 7:
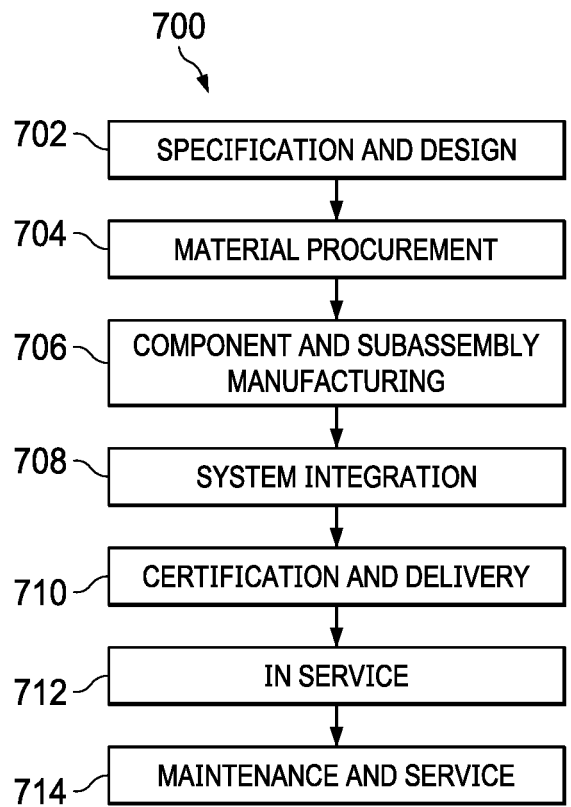
FIG. 7 is a manufacturing and service method, in accordance with one or more embodiments.
Figure 8:
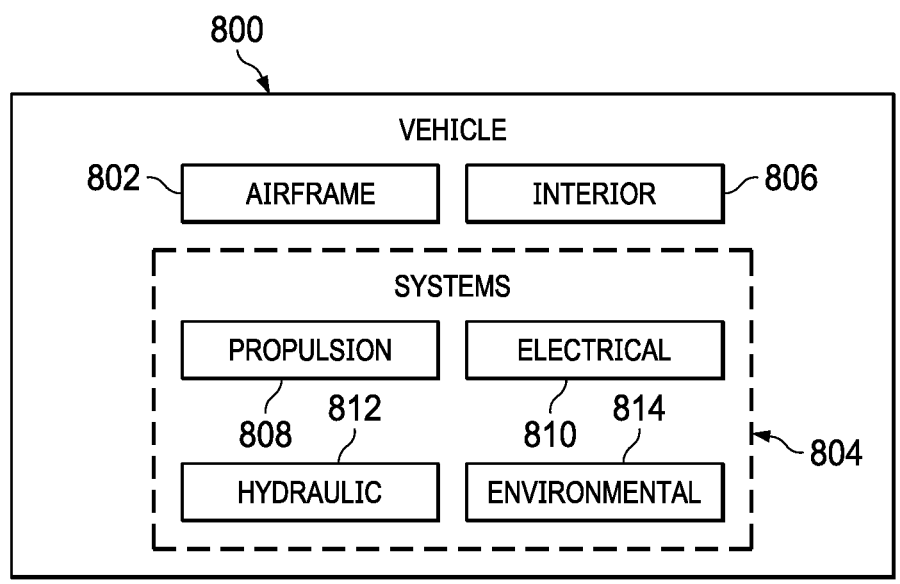
FIG. 8 describes an aircraft, in accordance with one or more embodiments.

Turning to FIG. 7, during pre-production, the exemplary aircraft manufacturing and service method (700) may include a specification and design (702) of the aircraft (800) in FIG. 8 and a material procurement (704) for the aircraft (800). During production, the component and subassembly manufacturing (706) and system integration (708) of the aircraft (800) in FIG. 8 takes place. Thereafter, the aircraft (800) in FIG. 8 may go through certification and delivery (710) in order to be placed in service (712). While in service by a customer, the aircraft (800) in FIG. 8 is scheduled for routine maintenance and service (714), which may include modification, reconfiguration, refurbishment, and other maintenance or service.

Each of the processes of the aircraft manufacturing and service method (700) may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

With reference now to FIG. 8, an illustration of an aircraft (800) is depicted in which an advantageous embodiment may be implemented. In this example, the aircraft (800) is produced by the aircraft manufacturing and service method (700) in FIG. 7. The aircraft (800) may include airframe (802) with systems (804) and an interior (806). Examples of systems (804) include one or more of a propulsion system (808), an electrical system (810), a hydraulic system (812), and an environmental system (814). Any number of other systems may be included.

Although an aerospace example is shown, different advantageous embodiments may be applied to other industries, such as the automotive industry. Thus, for example, the aircraft (800) may be replaced by an automobile or other vehicle or object in one or more embodiments.

The apparatus and methods embodied herein may be employed during any one or more of the stages of the aircraft manufacturing and service method (700) in FIG. 7. For example, components or subassemblies produced in the component and subassembly manufacturing (706) in FIG. 7 may be fabricated or manufactured in a manner similar to components or subassemblies produced while the aircraft (800) is in service (712) in FIG. 7.

Also, one or more apparatus embodiments, method embodiments, or a combination thereof may be utilized during production stages, such as the component and subassembly manufacturing (706) and system integration (708) in FIG. 7, for example, by substantially expediting the assembly of or reducing the cost of the aircraft (800). Similarly, one or more of apparatus embodiments, method embodiments, or a combination thereof may be utilized while the aircraft (800) is in service (712) or during maintenance and service (714) in FIG. 7.

For example, one or more of the advantageous embodiments may be applied during component and subassembly manufacturing (706) to rework inconsistencies that may be found in composite structures. As yet another example, one or more advantageous embodiments may be implemented during maintenance and service (714) to remove or mitigate inconsistencies that may be identified. Thus, the one or more embodiments described with respect to FIG. 1 through FIG. 8 may be implemented during component and subassembly manufacturing (706) and/or during maintenance and service (714) to remove or mitigate inconsistencies that may be identified.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A system comprising:
a computer configured to receive, from a rework facility, shape data from a scan of a scarf in an object comprising a composite material located at the rework facility; and
a lathe tool located at a patch generation facility remote from the rework facility, the late tool in communication with the computer, wherein the lathe tool and the computer are configured to:
create a mandrel based on the shape data, the mandrel comprising a mandrel shape that is a negative of the shape data.

2. The system of claim 1, further comprising:
a layup tool disposed at the patch generation facility, the layup tool configured to place a composite layup on the mandrel; and
a heater disposed at the patch generation facility, the heater configured to form a pre-cured composite patch by heat-curing the composite layup.

3. The system of claim 2, further comprising:
a vacuum bag disposed at the patch generation facility, the vacuum bag configured to be placed over the composite layup during heat-curing of the composite layup.

4. The system of claim 2, further comprising:
a transport system configured to transport the pre-cured composite patch to the rework facility.

5. The system of claim 1, further comprising:
a scanning tool, located at the rework facility, and configured to scan the scarf, the scanning tool further configured to generate the shape data.

6. The system of claim 1, further comprising:
a scarf tool, located at the rework facility, and configured to prepare the scarf at an inconsistency on a composite surface of an aircraft.

7. The system of claim 6, further comprising:
a metrology tool, located at the rework facility, and configured to establish, as part of preparing the scarf, a metrology point with respect to the scarf.

8. The system of claim 7, further comprising:
a scanning tool, located at the rework facility, and configured to scan the scarf, the scanning tool further configured to generate the shape data.

9. The system of claim 8, further comprising:
a communication device, located at the rework facility, and configured to transmit the shape data to the patch generation facility.

10. The system of claim 9, further comprising:
a patch generation tool, located at the patch generation facility, configured to generate a composite patch according to the shape data.

11. The system of claim 10, further comprising:
wherein the patch generation tool is further configured to generate a counter metrology point on the composite patch.

12. The system of claim 11, further comprising:
a curing tool, located at the patch generation facility, and configured to pre-cure the composite patch at a first temperature to form a pre-cured composite patch.

13. The system of claim 12, wherein pre-curing comprises fully curing the composite patch.

14. The system of claim 13, further comprising:
a transport system configured to transport the pre-cured composite patch to the rework facility.

15. The system of claim 14, further comprising:
an adhesive application tool configured to apply an adhesive to the scarf.

16. The system of claim 15, further comprising:
a patch application tool configured to apply the pre-cured composite patch to the adhesive on the scarf, including matching the counter metrology point to the metrology point.

17. The system of claim 16, further comprising:
a curing tool configured to cure, after applying the pre-cured composite patch to the adhesive, the pre-cured composite patch at a second temperature sufficient to cure the adhesive.

18. The system of claim 17, wherein the second temperature is less than the first temperature.

19. The system of claim 17, further comprising:
wherein the first temperature comprises above about 350 degrees Fahrenheit and the second temperature comprises below about 250 degrees Fahrenheit.

20. The system of claim 1, wherein the mandrel comprises a carbon foam material, and wherein the system further comprises:
a sealing tool configured to seal a surface of the carbon foam material.

* * * * *